United States Patent Office  2,959,577
Patented Nov. 8, 1960

2,959,577

OLEFIN POLYMERIZATION CATALYST AND PROCESS

John Paul Hogan, Bartlesville, Okla., assignor to Phillips Petroleum Company, a corporation of Delaware No Drawing. Filed Apr. 2, 1958, Ser. No. 725,810

7 Claims. (Cl. 260—94.9)

This invention relates to a process for the production of normally solid polymers of olefins. In one aspect it relates to a novel catalyst.

It is known in the art to polymerize olefins to solid polymers at temperatures within the range 100 to 500° F. in the presence of a catalyst comprising chromium oxide supported upon certain oxides, at least part of the chromium in the catalyst being hexavalent. Processes of this type are described in U.S. Patent 2,825,721 issued March 4, 1958, to J. P. Hogan et al.

According to the present invention, an aliphatic olefin having from 2 to 8 carbon atoms per molecule and no chain branching nearer the double bond than the 4-position is polymerized to solid polymer in the presence of a catalyst comprising chromium oxide supported on a carrier material comprising an aluminum sulfate as its major component, at least part of the chromium in the catalyst being hexavalent.

The expression "an aluminum sulfate" encompasses within its scope, not only the compound $Al_2(SO_4)_3$ but also double sulfates of aluminum such as the alums, i.e. ammonium aluminum sulfate, sodium aluminum sulfate, and potassium aluminum sulfate. Other double sulfates of aluminum can also be used. The aluminum sulfate utilized as a carrier according to this invention can be utilized in either the anhydrous or the hydrated form. When the aluminum sulfate is hydrated, it is desirable in some cases to heat the sulfate to an elevated temperature to effect at least a partial dehydration prior to impregnation of the sulfate carrier with the chromium compound subsequently described.

The chromium content of the catalyst according to this invention is ordinarily within the range 0.5 to 10 weight percent but can range as high as 30 or even 50 weight percent. Ordinarily, the chromium oxide is the minor component of the catalyst and the aluminum sulfate is the major component. Chromium contents of the catalyst herein discussed are expressed in terms of elemental chromium on a weight percent basis, although the chromium is actually present as an oxide or a mixture of oxides.

The catalyst utilized according to this invention is generally prepared by depositing, on the aluminum sulfate, a chromium compound, for example, chromium trioxide or chromic nitrate, which can be ignited or calcined to a chromium oxide. The deposition of the chromium compound on the surface of the aluminum sulfate can be effected by grinding together, for example, chromium trioxide and anhydrous aluminum sulfate in the desired proportions, for example, in a ball mill. Alternatively, an aqueous solution of chromium trioxide or chromic nitrate can be sprayed onto the surface of the aluminum sulfate, dried, and activated as subsequently described.

The final step in the catalyst preparation is generally referred to as an activation step. This ordinarily involves heating the composite of chromium compound and aluminum sulfate at an elevated temperature, ordinarily within the range 500 to 1500° F., preferably 750 to 1300° F. The time required for the activation step ordinarily varies from about 1 to about 20 hours. One function of the activation step is to insure that at least part of the chromium in the final catalyst will be present in the hexavalent condition at the time when the catalyst is first contacted with hydrocarbon. The activation is ordinarily and preferably carried out in a nonreducing atmosphere. Thus the atmosphere can be nitrogen or carbon dioxide. However, it is preferable that the atmosphere of activation contain free oxygen. Therefore the activation atmosphere can be pure oxygen or oxygen diluted with an inert gas, e.g. air. It is further preferred that the activation atmosphere be substantially anhydrous, i.e. that it have a dew point below about 0° F. After the activation step, the catalyst is stored out of contact with moisture, preferably in a dry inert atmosphere such as nitrogen, until the catalyst is used for the polymerization reaction. It is desired that at least 0.1 weight percent of the total finished catalyst be chromium in the hexavalent state. It is further preferred that the hexavalent chromium content of the finished catalyst be at least 0.5 weight percent.

Suitable monomeric starting materials for use in this invention are the 1-olefins having from 2 to 8 carbon atoms per molecule and no branching nearer the double bond than the 4-position. Suitable aliphatic 1- olefins within this class include ethylene, propylene, 1-butene, 1-pentene, 1-hexene, and 4-methyl-1-pentene.

The reaction can be effected with the olefin either in the gaseous or the liquid phase. Ordinarily, it is preferred that an inert diluent be present in the feed to the catalytic reactor. The diluent can be any hydrocarbon which is inert and nondeleterious toward the catalyst under the reaction conditions. Preferred diluents are liquefiable hydrocarbons of the paraffin and cycloparaffin series. However, aromatic hydrocarbons such as benzene, toluene, and the xylenes can be used, although they, or impurities therein, appear to decrease the yields below the maximum values otherwise obtainable. Preferred diluents include propane, isobutane, normal butane, normal pentane, isopentane, the isohexanes, normal hexane and 2,2,4-trimethylpentane. Other preferred diluents are those of the cycloparaffin series, and include cyclopentane, methylcyclopentane, cyclohexane, methylcyclohexane, and the dimethylcyclohexanes. It is ordinarily preferred that the olefin content of the feed to the reaction zone, based on olefin plus diluent, be within the range 1 to 20 weight percent. Ordinarily charge withdrawal rates into and from the reaction zone are maintained so that the polymer concentration in the reaction mixture is within the range 1 to 20 weight percent.

The contacting of the monomeric olefin with the catalyst can be conducted in accordance with any of the techniques known in the catalytic arts, particularly those described in U.S. Patent 2,825,721 (1958), already cited. Thus the catalyst can be used in the form of a fixed bed, a fluidized dense bed, or a suspension or slurry in the diluent. A highly satisfactory method comprises suspending the finely ground catalyst (ordinarily in the range 20 mesh to a few microns particle size) in the diluent, supplying this slurry to the reaction zone along with the olefin, while stirring the entire reaction mixture mechanically or pneumatically.

The polymerization reaction in accordance with this invention is conducted at a temperature within the range 100 to 500° F., preferably 150 to 350° F., and more preferably from 200 to 300° F. The pressure can range from atmospheric to a thousand pounds or more but is ordinarily sufficient to maintain the diluent, when present, substantially in the liquid phase. Pressures greatly in excess of that necessary to maintain liquid phase conditions can be used but are not necessary. When slurry type contacting, as herein described, is used, the time of residence of the reactants in the reaction zone is ordinarily within the range from about 15 minutes to about 6 hours. When the catalyst is used in the form of a stationary bed, the liquid hourly space velocity can range from about 0.5 to about 20.

In order to recover the solid olefin polymers from the reaction mixture, the mixture is withdrawn from the reaction zone and any unreacted olefin is removed by venting. The unvaporized material can then be heated to a sufficient temperature and under autogenous pressure to insure maximum dissolution of the polymer. The catalyst can then be removed by filtration. (Optionally, the filtration step to remove catalyst can be omitted.) The solution of polymer in the solvent or diluent can then be treated for recovery of the polymer. This can be accomplished by cooling to precipitate the polymer or heating to vaporize the solvent, or a combination of both.

The polymers produced in accordance with this invention are solid thermoplastics and can be utilized where materials of this type ordinarily are used. The applications are generally those known in the art for solid polyethylenes, polypropylenes, and the like. Thus, these polymers can be molded or otherwise shaped to form various articles such as liquid containers. They can be cast to form machine parts such as gears. Alternatively, the polymers can be fabricated into the form of films for use in packaging or into filaments for the production of fabrics, ropes, and the like.

*Example I*

A mixture of anhydrous aluminum sulfate and chromium trioxide was crushed and ground together in a ball mill, in the absence of any liquid, to effect thorough mixing. The resulting mixture was then heated for a period of 5 hours at a temperature of 950° F. in a stream of air having a dew point below 0° F. The total chromium content of the catalyst obtained was 0.93 weight percent. The hexavalent chromium content was 0.21 weight percent. Approximately 3 grams of the resulting catalyst was suspended in 450 grams of cyclohexane in a 1.4-liter reactor provided with a mechanical stirrer. The reactor was closed and sealed to maintain pressure, and purified ethylene was forced into the reactor at a rate just sufficient to maintain the reactor pressure at 450 p.s.i. gauge. The reactor temperature was maintained at 280° F. The reaction time was between 1 and 1½ hours, during which time the reactor contents were continuously stirred. The reactor and its contents were then cooled to room temperature, and the reactor was opened, after the unreacted ethylene had been vented. The cyclohexane was flashed from the reactor contents and the solid polyethylene was dried overnight in an oven. The yield of solid polyethylene was 2.3 grams per gram of catalyst utilized.

*Example II*

The procedure of Example I was repeated in all details except that the reactor temperature was maintained at 210° F. The yield of polyethylene was 3.0 grams per gram of catalyst.

The polyethylenes obtained according to Examples I and II were substantially insoluble in tetralin at 130° C. This indicates an inherent viscosity greater than 10.

*Example III*

The procedure of Example I is repeated at 200° F. and about 120 p.s.i.g., propylene being substituted for ethylene as a reactant. Solid polypropylene is produced.

Variation and modification within the scope of the disclosure and the claims to this invention can readily be practiced by those skilled in the art. Thus the various monomers listed herein can be copolymerized with each other to form copolymers, for example, ethylene-propylene copolymer.

What is claimed is:

1. A process which comprises polymerizing, at a polymerization temperature in the range 100 to 500° F., an aliphatic 1-olefin having from 2 to 8 carbon atoms per molecule and no chain branching nearer the double bond than the 4-position, in the presence of a catalyst comprising chromium oxide, in which at least part of the chromium is hexavalent, supported on a carrier comprising an aluminum sulfate as its major component.

2. A process which comprises polymerizing, at a polymerization temperature in the range 150 to 350° F., an aliphatic 1-olefin, having from 2 to 8 carbon atoms per molecule and no chain branching nearer the double bond than the 4-position, in the presence of an inert liquid hydrocarbon diluent, and in the presence of a catalyst comprising chromium oxide supported on a carrier comprising an aluminum sulfate as its major component, the hexavalent chromium content of said catalyst being at least 0.1 weight percent based on total catalyst weight, maintaining the pressure during the polymerization sufficiently high to maintain said diluent substantially in the liquid phase, and recovering a resulting normally solid polymer.

3. A process which comprises polymerizing ethylene, in the presence of a liquid saturated hydrocarbon diluent, at a polymerization temperature in the range 150 to 350° F., and in the presence of a catalyst consisting essentially of chromium oxide supported on a carrier comprising an aluminum sulfate as its major component, the hexavalent chromium content of said catalyst being at least 0.1 weight percent of the total catalyst weight, maintaining a polymerization pressure sufficiently high to maintain said diluent substantially in the liquid phase, and recovering a normally solid polyethylene.

4. A process which comprises polymerizing ethylene, in the presence of a liquid saturated hydrocarbon diluent, at a polymerization temperature in the range 150 to 350° F., and in the presence of a catalyst consisting essentially of from 0.5 to 10 weight percent chromium in the form of chromium oxide supported on a carrier comprising aluminum sulfate as its major component, the hexavalent chromium content of said catalyst being at least 0.1 weight percent of the total catalyst weight, maintaining a polymerization pressure sufficient to maintain said diluent substantially in the liquid phase, and recovering a resulting solid polyethylene.

5. A process which comprises polymerizing ethylene, in admixture with cyclohexane as a diluent, at a polymerization temperature in the range 200 to 300° F., and in the presence of a catalyst consisting essentially of from 0.5 to 10 weight percent chromium in the form of chromium oxide supported on a carrier comprising anhydrous aluminum sulfate as its major component, the hexavalent chromium content of said catalyst being at least 0.5 weight percent of the total catalyst weight, maintaining a pressure sufficient to maintain said cyclohexane substantially in the liquid phase, and recovering a resulting solid polyethylene.

6. A catalyst comprising chromium oxide supported on an aluminum sulfate, at least part of the chromium in said catalyst being hexavalent.

7. A catalyst consisting essentially of chromium oxide supported on substantially anhydrous aluminum sulfate, the total chromium content of said catalyst being within the range 0.5 to 10 weight percent, and the hexavalent chromium content of said catalyst being at least 0.1 weight percent.

References Cited in the file of this patent

UNITED STATES PATENTS

| | | |
|---|---|---|
| 2,423,612 | Mulligan | July 8, 1947 |
| 2,825,721 | Hogan et al. | Mar. 4, 1958 |

OTHER REFERENCES

"Catalysis" (Emmett), Reinhold Publishing Corporation (New York), 1954 (pages 245–272).